(12) United States Patent
Willinger et al.

(10) Patent No.: US 6,213,055 B1
(45) Date of Patent: Apr. 10, 2001

(54) ERGONOMIC HANDLE FOR GROOMING BRUSH

(75) Inventors: Jonathan Willinger, East Rutherford, NJ (US); Yoon Ho Choi, New York, NY (US)

(73) Assignee: J. W. Pet Company, Hasbrouck Heights, NJ (US)

(*) Notice: Subject to any disclaimer, the term of this patent is extended or adjusted under 35 U.S.C. 154(b) by 0 days.

(21) Appl. No.: 09/218,252

(22) Filed: Dec. 21, 1998

(51) Int. Cl.[7] .............................. A01K 13/00; A46B 5/02
(52) U.S. Cl. ............................................ 119/633; 15/143.1
(58) Field of Search ........................................ 119/613, 614, 119/631, 632, 633; 15/30, 50.1, 77, 143.1, 145; 132/120, 121, 150

(56) References Cited

U.S. PATENT DOCUMENTS

| | | | |
|---|---|---|---|
| 238,297 | * 3/1881 | Lawrence ................ | 119/633 |
| 487,580 | * 12/1892 | Neuls ..................... | 119/631 |
| 1,852,362 | 4/1932 | Newby . | |
| 2,150,260 | 3/1939 | Beery ..................... | 132/11 |
| 2,633,591 | 4/1953 | Servilla .................. | 15/160 |
| 3,010,131 | 11/1961 | Kisky ..................... | 15/167 |
| 3,474,481 | 10/1969 | Soleymani .............. | 15/167 |
| 3,491,777 | * 1/1970 | Grosbard ................ | 132/120 |
| 4,974,286 | 12/1990 | Stowell et al. .......... | 16/111 R |
| 5,305,490 | 4/1994 | Lundgren ................ | 15/167.1 |
| 5,465,449 | * 11/1995 | Lewkowicz ............. | 15/143.1 |
| 5,503,109 | 4/1996 | Sporn ..................... | 119/94 |
| 5,864,915 | * 2/1999 | Ra ......................... | 15/143.1 |

* cited by examiner

Primary Examiner—Charles T. Jordan
Assistant Examiner—Elizabeth Shaw
(74) Attorney, Agent, or Firm—Helfgott & Karas, P.C.

(57) ABSTRACT

A brush handle is formed with a continuously arched upper surface portion and a lower surface portion separated into two arched portions by a humped semi-circular ridge. One of the lower arched portions forms a trigger grip for a single finger held in either a forehand or backhand grip. The handle is preferably covered with a high friction material in the form of a contoured rubber or elastomeric sleeve which is stretched over a complimentarily contoured molded plastic handle.

15 Claims, 4 Drawing Sheets

ERGONOMIC HANDLE FOR GROOMING BRUSH

BACKGROUND OF THE INVENTION

1. Field of the Invention

The present invention relates in general to hand held tools and relates in particular to a brush having an ergonomic handle formed with a single saddle-shaped finger grip.

2. Description of Prior Developments

Grooming brushes have been available in various shapes and sizes for carrying out different grooming functions. In some cases, it is desirable to be able to reverse one's grip on a grooming brush to facilitate a backhanded brush stroke. If one's grip is weak, such a backhanded stroke is difficult. Moreover, even a forehanded brush stroke can be difficult or even impossible for someone suffering from arthritis, carpal tunnel syndrome, hand injury or some other gripping infirmity.

Accordingly, a need exists for a grooming brush which can be held with either a forehand or backhand grip and which requires a minimum of strength and dexterity to grip and stroke.

A further need exists for such a brush which can be operated primarily with a single gripping finger with either a forehand or backhand grip.

Yet another need exists for a grooming brush which has a high friction gripping surface which is contoured to enable one to securely grip the handle surface with a minimum of force.

Still another need exists for a grooming brush which reduces the likelihood of snagging due to sharp corners or other projections unrelated to grooming bristles or teeth.

SUMMARY OF THE INVENTION

The present invention has been developed to fulfill the needs noted above and therefore has as an object the provision of a grooming brush having a high friction gripping surface contoured to require a minimum of strength and dexterity to grip and stroke.

Another object of the invention is the provision of a grooming brush which can be held and used with one or more fingers with both a forehand and a backhand grip.

Another object of the invention is the provision of a grooming brush having virtualy no sharp corners so as to avoid snagging during brushing.

Yet another object of the invention is the provision of a grooming brush having an ergonomic handle provided with a saddle portion which centers and anchors one's little or pinky finger in a comfortable orientation to allow brushing with a minimum of effort and gripping strength.

Still another object of the invention is the provision of a grooming brush having a rigid handle fitted with a high friction gripping sheath.

These and other objects are met by the present invention which is directed to a grooming brush having an ergonomic handle contoured to allow gripping and use with a minimum of strength and dexterity. A high friction gripping surface in the form of a molded rubber sleeve or sheath is fitted over a complimentary shaped handle. The handle and sheath define a contoured gripping surface for centering and anchoring one's pinky finger in a backhand grip and for centering and anchoring one's index finer in a forehand grip.

The top of the handle has a mildly arched surface for comfortably matching a user's palm. The bottom of the handle includes a saddle-shaped portion which positively seats a single finger and separates that finger from the rest of a user's gripped or ungripped fingers. A brush head is attached to the handle for supporting any number of various bristles or teeth. The brush head is devoid of sharp corners to avoid snagging or nicking a pet or other subject being groomed. Rounded brush head contours are particularly appreciated when a pet is brushed around its rear legs and around and beneath its tail.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various views of the drawings, like reference characters designate like or similar parts.

DETAILED DESCRIPTION OF THE PREFERRED EMBODIMENTS

Figure 1:
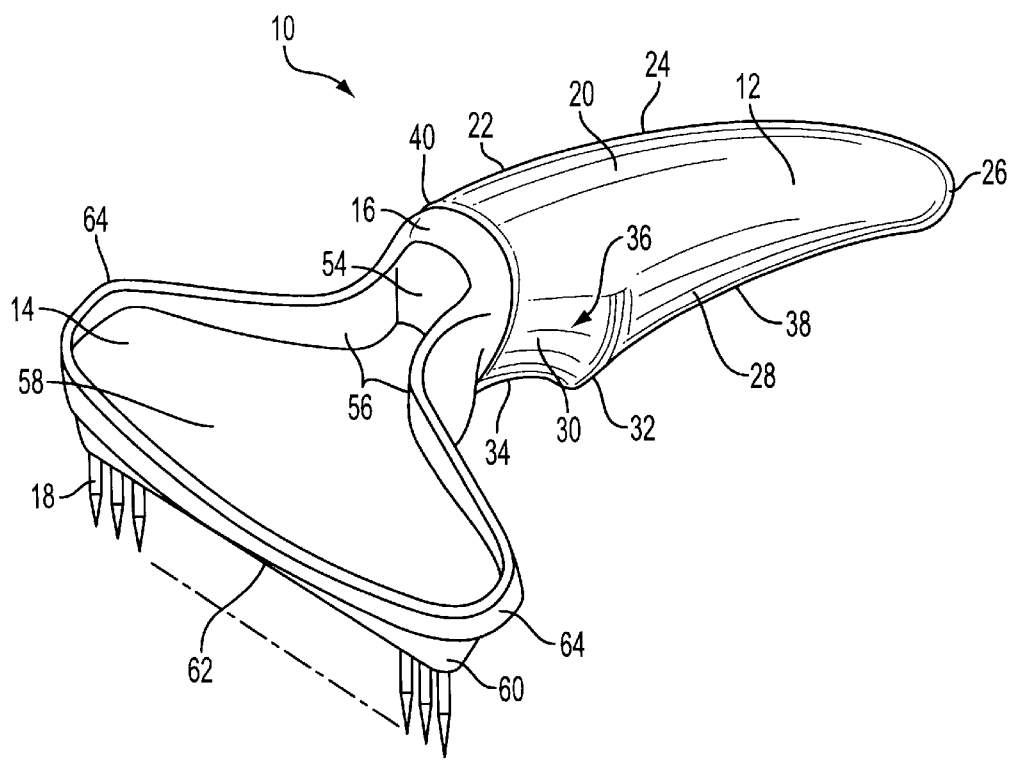
FIG. 1 is a perspective view of a pet grooming brush constructed in accordance with a first embodiment of the invention.

The present invention will now be described in conjunction with the drawings, beginning with FIG. 1 which shows a grooming brush 10 constructed in accordance with the invention. Brush 10 is of the type or style known as a Coleman brush and includes an axially or longitudinally extending elongated handle 12 which is connected to a brush head 14 via a transition or neck portion 16. Brush 10 is shown with a single row of rigid teeth 18 extending downwardly from the brush head 14. Of course, any type of teeth or bristles arranged in virtually any pattern can be provided on brush head 14 in a known fashion.

Handle 12 is formed with an ergonomic grip-conforming contour that allows a user to securely hold handle 12 with a minimum of strength and dexterity. In fact, all that is required to hold handle 12 and to stroke brush 10 is a single finger and one's palm, as discussed below.

The top portion 20 of handle 12 defines a longitudinally-extending arched surface 22 beginning at neck portion 16, arching mildly upwardly and rearwardly to a central apex 24 and then arching mildly downwardly to a rounded, somewhat hemispherical or cup-shaped end portion 26. The lower portion 28 of handle 12 includes a circumferentially-extending U-shaped grooved band or contour 30 which extends over about the lower half of the handle adjacent the neck portion 16.

The U-shaped contour 30 is also arched longitudinally from the neck portion 16 rearwardly to a hump-shaped ridge 32 which extends circumferentially along the lower half of the handle 12. This longitudinally arched portion 34 together with the U-shaped contour defines a compound arch on the lower half of the handle thereby forming a three dimensional saddle-shaped contour 36 extending axially and circumferentially along the underside of handle 12.

It can be appreciated that the saddle contour 36 forms a comfortable gripping recess for guiding and holding one of a user's fingers securely therein. Ridge 32 prevents a user's finger from slipping longitudinally (axially) rearward from the saddle contour 36 when the brush is pulled rearward during grooming. In this manner, saddle contour 36 and ridge 32 provide a trigger-type finger grip.

The lower portion 28 of the handle 12 defines a second longitudinally arched portion 38 which extends upwardly and rearwardly in a mild curve from ridge 32 to the rounded dome-shaped end portion 26. This second arched portion 38 provides a comfortable gripping surface for a user's middle, ring and pinky fingers when the brush is used in a normal forehanded grip. Arched portion 38 is preferably at least two, three, four or more times the length of the saddle portion 36. In the example of FIG. 1, arched portion 38 is about three times the length of saddle portion 36.

Figure 2:
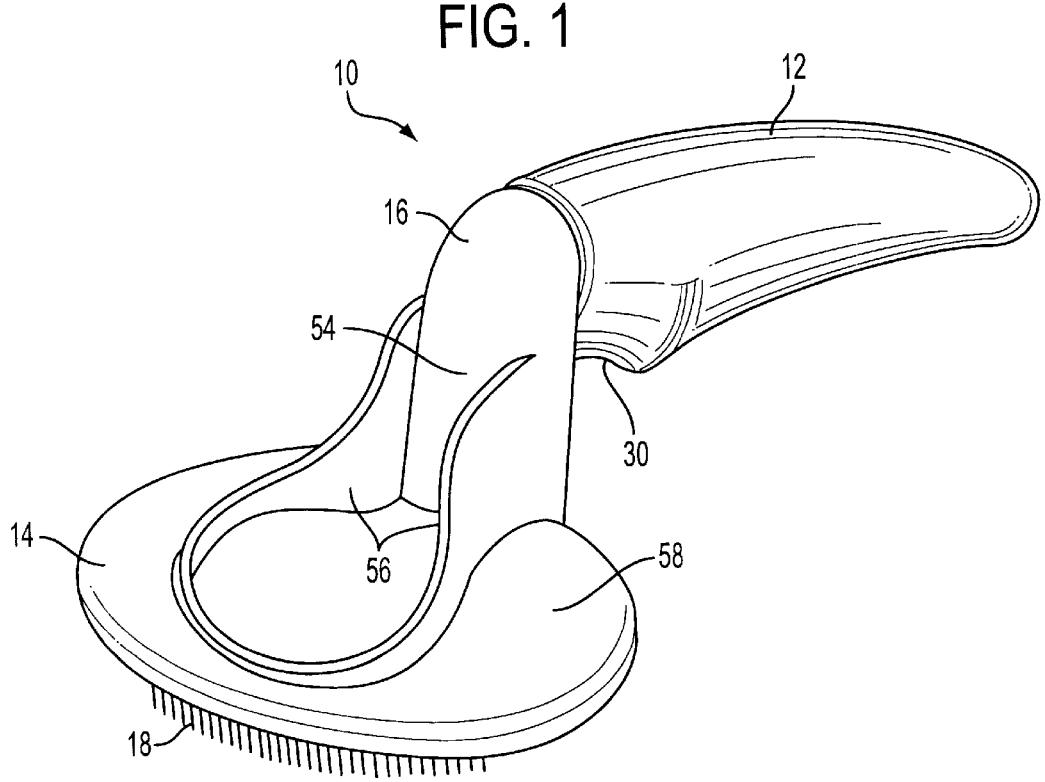
FIG. 2 is a perspective view of a grooming brush constructed in accordance with a second embodiment of the invention.
Figure 7:
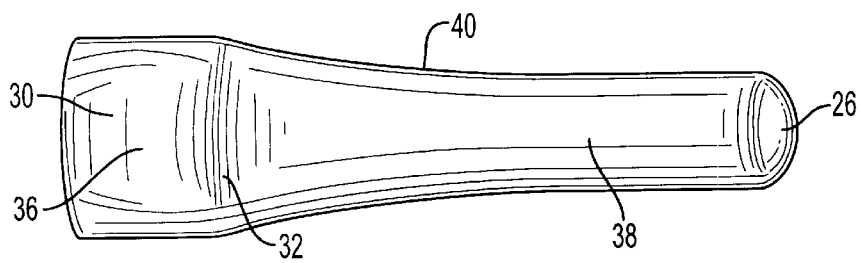
FIG. 7 is a bottom view of the sheath of FIG. 3.
Figure 5:
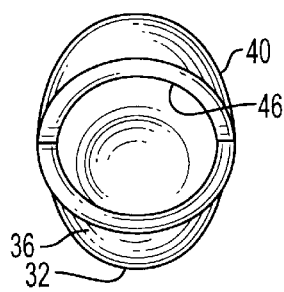
FIG. 5 is a front or left end view of the sheath of FIG. 4.
Figure 6:
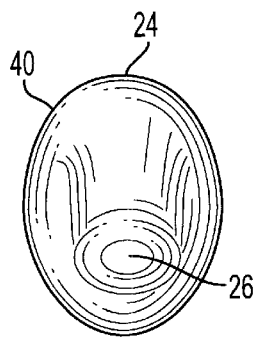
FIG. 6 is a rear or right end view of the sheath of FIG. 4.
Figure 8:
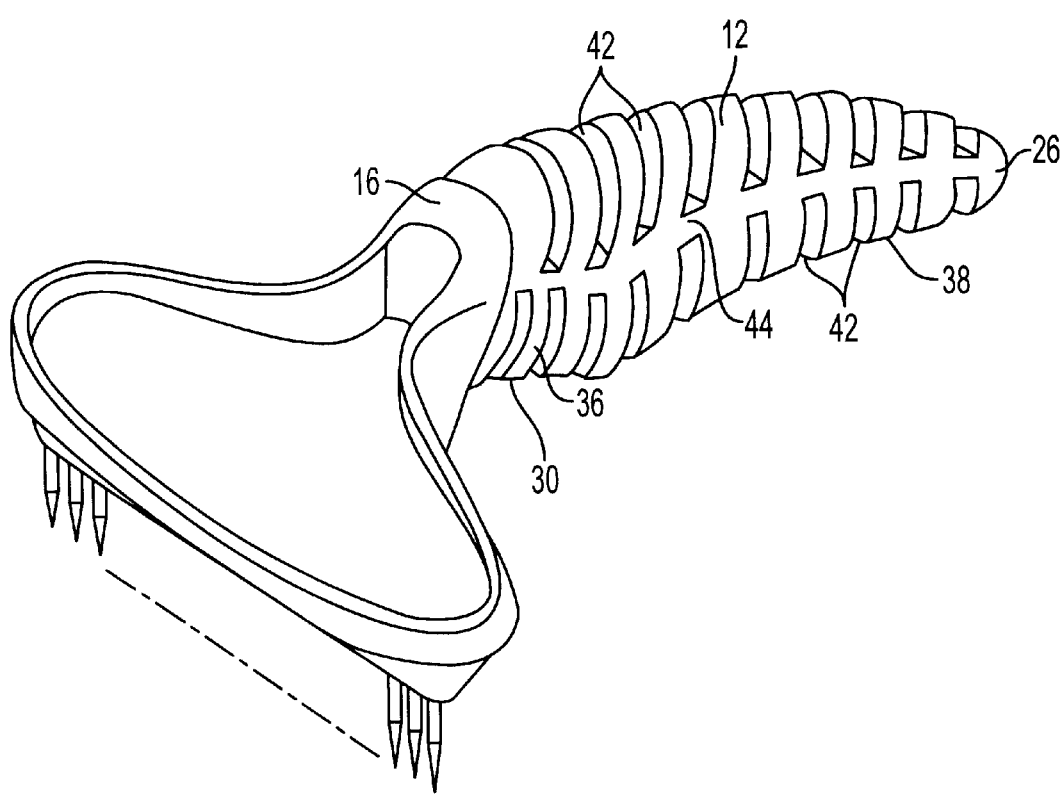
FIG. 8 is a view of the brush of FIG. 1 with the rubber sleeve of FIG. 3 removed from the handle.

Additional details of handle 12 are shown in FIGS. 3 through 7 wherein a soft pliable rubber sleeve 40 is seen to be shaped to closely match the surface contours of the plastic molded handle 12 of FIGS. 1, 2 and 8. Sleeve 40 is resiliently stretched over the handle 12 of FIG. 8 to construct the handle 12 of FIG. 1. Adhesives or fasteners may be used to hold and fix the sleeve on the handle.

As seen in FIG. 8, handle 12 of FIG. 1 may be molded as a solid one-piece molding with or without a series of longitudinally-spaced arch-shaped slots 42 formed along the upper or top portion 20 and the lower or bottom portion 28 of handle 12. If slots 42 are formed in handle 12, a central transverse rib 44 is molded centrally between the upper and lower slots 42. Slots 42 provide a lighter weight and more economical handle by reducing the volume of plastic in the handle.

Figure 3:
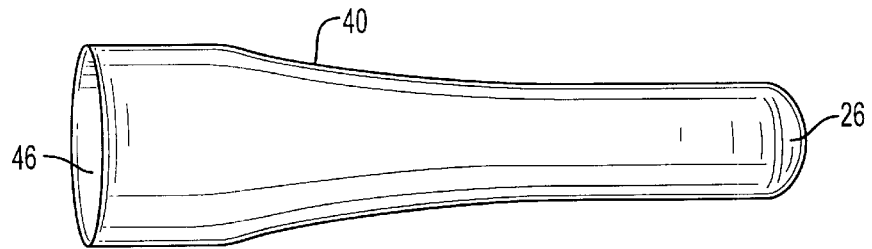
FIG. 3 is a top view of a rubber sheath which is fitted over the handles of FIGS. 1 and 2.
Figure 4:
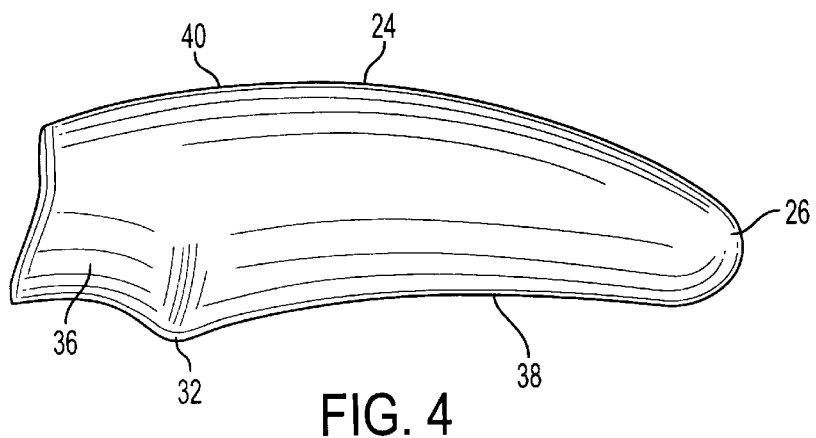
FIG. 4 is a side elevation view of the sheath of FIG. 3.

Referring again to FIGS. 3 through 7 and 8, sleeve 40 and handle 12 have a relatively large height and width along saddle portion 36. The sleeve extends from an open, substantially circular mouth 46 rearwardly to the hump-shaped ridge 32. As the sleeve and handle extend rearwardly from the ridge 32, the width of the sleeve tapers symmetrically inwardly from side to side as seen in FIGS. 3 and 7 and the height of the sleeve and handle tapers symmetrically inwardly toward end portion 26.

Figure 9:
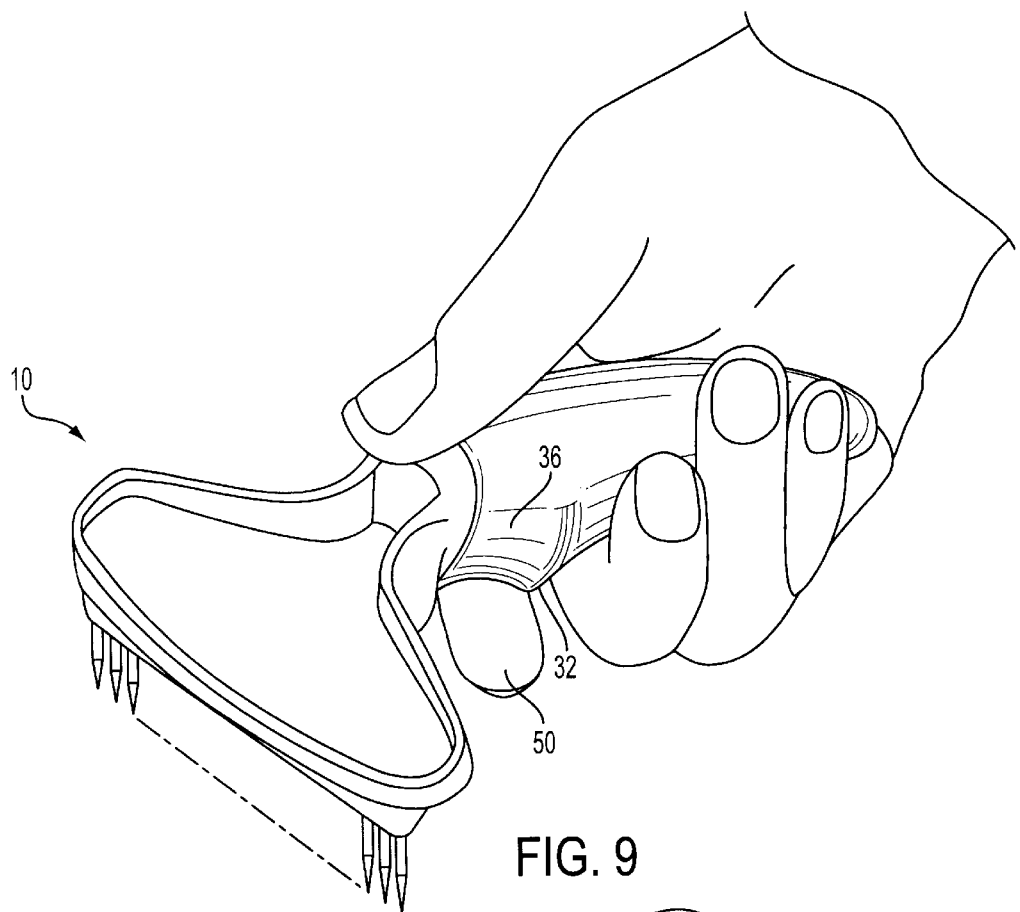
FIG. 9 is a perspective view of the brush of FIG. 1 held in a forehand grip.

In this manner, ridge 32 and saddle 36 form a trigger type grip with the tapering second arched portion 38 on the underside of the handle and sleeve allowing one's fingers to wrap substantially completely around the handle, if desired. This type of forehand grip is illustrated in FIG. 9. It is also possible to comfortably and securely hold handle 12 with a backhand grip as shown in FIG. 10.

Figure 10:
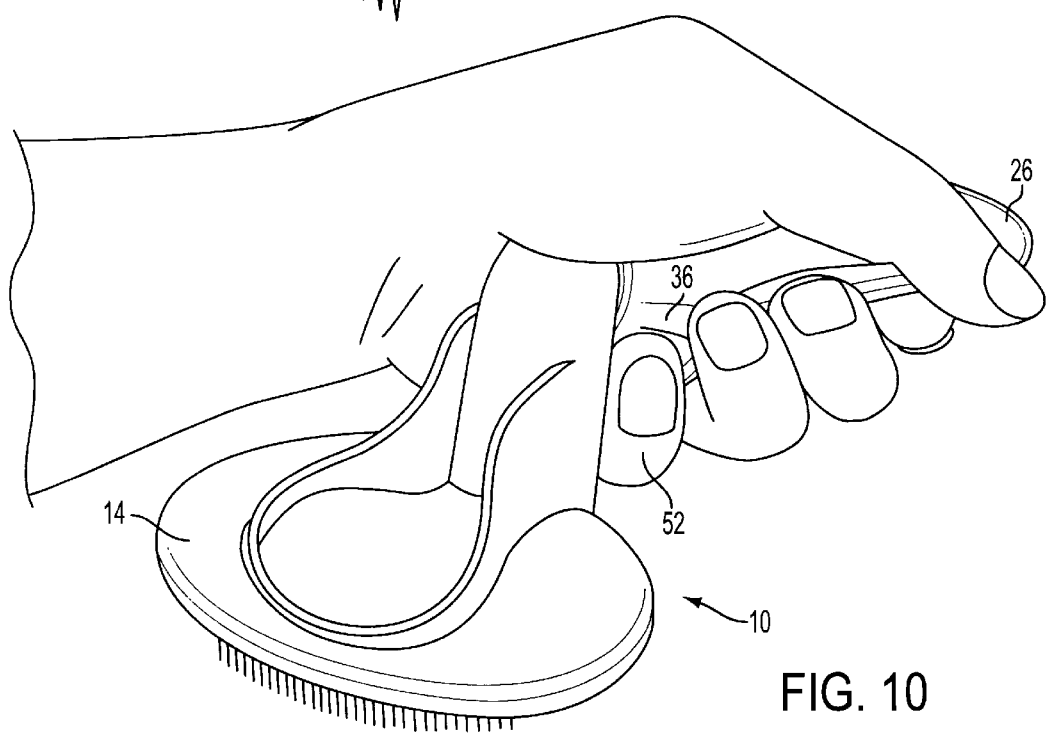
FIG. 10 is a perspective view of the brush of FIG. 2 held in a backhand grip.

With the forehand grip of FIG. 9, an index finger 50 is aligned and held within the saddle portion 36 and with the backhand grip of FIG. 10, a pinky finger 52 is held within the saddle portion 36. In each case, only one finger is actually needed to hold handle 12 securely within and against one's palm, i.e., the finger held within the saddle portion 36. The remaining fingers can provide additional gripping force, but this is generally not required.

Referring again to FIG. 1, it is seen that the neck portion 16 of brush 10 includes a vertical end wall 54 from which extends a pair of vertical side walls 56. Side walls 56 form a strong reinforcement and interconnection between neck portion 16 and brush head 14. Walls 56 extend completely around the flat planar top portion 58 of brush head 14 and join one another along the leading edge of the brush head. Teeth 18 may be molded within a transverse strengthening and support rib 60 formed on the bottom of brush head 14.

It should be noted that the peripheral edge 62 of brush head 14 defines smooth rounded side edges 64 which resist snarling, entangling and nicking of a subject being groomed. In fact, the brush 10 is substantially free of sharp corners and edges, other than those formed by the bristles or teeth 18.

A second embodiment of the invention is shown in FIGS. 2 and 10 in the form of a slicker brush with fine wire teeth 18 arranged in a round or oval pattern. In this construction, handle 12 is substantially identical to handle 12 of FIG. 1. However, the transition or neck portion 16 has an extended or elongated vertical end wall 54 and vertically elongated side walls 56. Brush head 14 is substantially circular or oval rather than somewhat triangular as in FIG. 1. This rounded shape of the head is particularly useful for a slicker brush as it makes it easy to brush around a pet's legs and tail and has no sharp edges which can hurt a pet.

In each embodiment, the sidewalls 56 together with end wall 54 form a raised closed-loop wall extending upwardly around the top portion 58 of brush head 14. This looped wall adds strength and rigidity to the transition portion 16 and brush head 14. When the brush head 14 is laid flat on a horizontal surface, the transversely-extending vertical wall 54 vertically offsets the handle 12 from the head 14. This allows a groomer to stroke evenly along a flat surface with all bristles being used. The offset provides space for the groomer's fingers between the handle and grooming surface, such as a pet's body, and further provides additional leverage to the handle.

There has been disclosed heretofore the best embodiment of the invention presently contemplated. However, it is to be understood that various changes and modifications may be made thereto without departing from the spirit of the invention.

What is claimed:

1. A brush, comprising:
   a longitudinally-extending elongated handle;
   a head; and
   a transition portion interconnecting said handle and said head;
   said handle having a single continuously-curved longitudinally-extending upper portion and a lower portion comprising a first longitudinally-arched portion, a second longitudinally-arched portion and a ridge separating said first and second arched portions;
   said upper portion comprising a convex side profile, and each of said first and second longitudinally-arched portions of said lower portion comprising a concave side profile when viewed along the longitudinal axis of the brush.

2. The brush of claim 1, further comprising a high friction sheath provided substantially on said upper and lower portions of said handle.

3. The brush of claim 1, wherein said handle has a plurality of slots formed therein.

4. The brush of claim 1, wherein said handle has a first series of slots formed along said upper portion and a second series of slots formed along said lower portion.

5. The brush of claim 1, further comprising a circumferentially-extending U-shaped band located on said first arched portion, said U-shaped band and said first arched portion defining a saddle-shaped finger grip.

6. The brush of claim 1, wherein said second arched portion is at least twice as long as said first arched portion.

7. The brush of claim 1, wherein said handle has a rounded end portion.

8. The brush of claim 7, wherein said handle tapers laterally inwardly from said ridge to said end portion.

9. The brush of claim 1, wherein said head defines a peripheral edge formed solely with rounded contours.

10. The brush of claim 1, wherein said upper portion of said handle arches upwardly from said transition portion to an apex and arches downwardly from said apex to an end portion of said handle.

11. A pet grooming brush, comprising:

a head:

an ergonomic handle connected to said head, said handle comprising an arched upper portion for engaging a user's palm and a lower portion comprising a single saddle-shaped trigger grip; and a sleeve fitted over said handle.

12. The brush of claim 11, wherein said sleeve comprises a rubber sheath having an open mouth located proximate said head and a rounded closed end portion.

13. The brush of claim 11, wherein said handle is formed from a plastic material and said sleeve is formed from a material that is softer than said handle.

14. The brush of claim 13, wherein said sleeve is rubber.

15. A pet grooming brush, comprising:

a head;

an ergonomic handle connected to said head, said handle comprising an arched upper portion for engaging a user's palm and a lower portion comprising a single saddle-shaped trigger grip;

a transition portion interconnecting said head and said handle;

wherein said transition portion extends between said handle and said head such that said handle commences from a location transversely spaced from the plane of said head;

wherein said lower portion of said handle comprises an arched portion extending from said trigger grip rearwardly to an end portion of said handle.

* * * * *